(12) United States Patent
Cheuk et al.

(10) Patent No.: US 10,554,531 B2
(45) Date of Patent: *Feb. 4, 2020

(54) ENFORCING PARAMETERS FOR QUALITY OF DATA LINK SERVICE AT A FUTURE TIME

(71) Applicant: Verizon Patent and Licensing Inc., Basking Ridge, NJ (US)

(72) Inventors: Ho Yin Cheuk, Hoboken, NJ (US); Lixia Yan, Basking Ridge, NJ (US); Violeta Cakulev, Millburn, NJ (US); Sudhakar Reddy Patil, Flower Mound, TX (US); Raymond So, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 38 days.

This patent is subject to a terminal disclaimer.

(21) Appl. No.: 15/891,345

(22) Filed: Feb. 7, 2018

(65) Prior Publication Data

US 2018/0167302 A1 Jun. 14, 2018

Related U.S. Application Data

(63) Continuation of application No. 15/002,291, filed on Jan. 20, 2016, now Pat. No. 9,923,797.

(51) Int. Cl.
*H04L 12/26* (2006.01)
*H04L 12/24* (2006.01)

(52) U.S. Cl.
CPC .......... *H04L 43/16* (2013.01); *H04L 41/0893* (2013.01); *H04L 43/0876* (2013.01)

(58) Field of Classification Search
CPC .. H04L 43/16; H04L 41/0893; H04L 43/0876
USPC ................................................ 370/229, 235
See application file for complete search history.

(56) References Cited

U.S. PATENT DOCUMENTS

| 2012/0257526 | A1 | 10/2012 | Moeller et al. |
| 2013/0215793 | A1 | 8/2013 | Cutler et al. |
| 2014/0162593 | A1 | 6/2014 | Young et al. |
| 2014/0357222 | A1* | 12/2014 | Mohammed .......... H04M 15/70 455/406 |

* cited by examiner

*Primary Examiner* — Obaidul Huq

(57) ABSTRACT

A method is provided for enforcing quality of service parameters. A gateway receives a request for data usage from a mobile device. The gateway sends, to a controller, inquiry for allowed bit rate. Upon receiving a first bit rate value, the gateway sends, to a charging system, request for quota. In response to receiving the quota, the gateway provides data to the mobile device based on the first bit rate value. The gateway provides data to the mobile device until the quota is exhausted. Once a data usage threshold is reached, the gateway receives, from the controller, a second bit rate value. In response to receiving the second bit rate value, the gateway provides data to the mobile device based on the second bit rate value, until an activation-time is reached. When the activation-time is reached, the gateway resets the allowed bit rate to the first bit rate value.

20 Claims, 6 Drawing Sheets

US 10,554,531 B2

ENFORCING PARAMETERS FOR QUALITY OF DATA LINK SERVICE AT A FUTURE TIME

CROSS-REFERENCES TO RELATED APPLICATIONS

This application is a continuation of U.S. application Ser. No. 15/002,291, entitled "Enforcing Parameters for Quality of Data Link Service at a Future Time", filed on Jan. 20, 2016, the entirety of which is incorporated by reference herein.

BACKGROUND

Long Term Evolution (LTE) standard, also referred to as 4G LTE, provides regulations for wireless communication of high-speed data for mobile phones and data terminals. The network technologies providing the wireless communication can increase the capacity and speed using a different radio interface together with core network improvements. A wireless network provider typically registers a customer with a specific data plan determining the data usage limit for the customer and customers can sign up for data plans based on their need for data and for the access speed. For example, a customer with extreme data needs may sign up for an unlimited data plan, which allows the customer to use as much data as desired during a billing cycle. However, such customers with unlimited data access behavior may impact the user experience of other customers within the same Radio Access Network (RAN) section. Wireless network providers can use mechanisms such as, for example, bandwidth throttling to effectively manage the network resources and ensure network reliability by preventing the heaviest usage customers from causing congestion to other customers. For example, for customers with unlimited data plan, when data usage within a billing cycle exceeds a certain threshold, (e.g. 5 Gigabytes), the network can put the customers on a lower speed for the rest of the billing cycle. In this case, at the start of a new billing cycle, the restriction can be removed and the customers can resume high data speed.

However, at the billing cycle reset time, potentially high volume of messages need to be exchanged within the network for removing the speed restriction on the customers with applied restriction. This is because the current network standards do not provide a mechanism to set command level parameters to take effect in a future time.

Therefore, a need exists for a mechanism to throttle customer bandwidth once data usage threshold by that customer is reached, and enforce resumption of high speed data access at a future time such as the start time of a new billing cycle.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
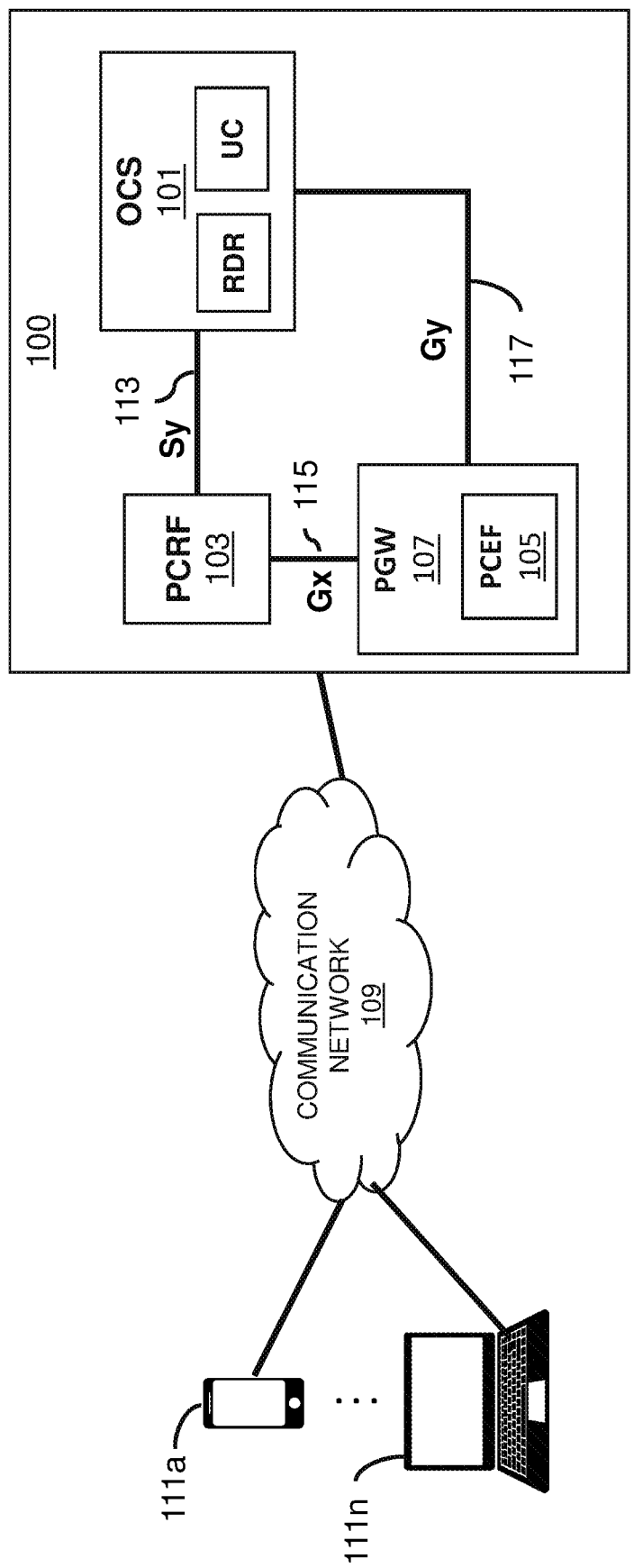
FIG. 1 illustrates a high-level functional block diagram of a data service provider providing data services to customers, where bandwidth throttling is applied.

In the following detailed description, numerous specific details are set forth by way of examples in order to provide a thorough understanding of the relevant teachings. However, the present teachings may be practiced without such details. In other instances, well known methods, procedures, components, and/or circuitry have been described at a relatively high-level, without detail, in order to avoid unnecessarily obscuring aspects of the present teachings.

As wireless communication of high-speed data for mobile phones and other computing devices becomes more popular and the number of wireless data users increase, there has to be some way to control the bandwidth allowed to individual users. Long Term Evolution (LTE) standards, which provide regulations for wireless communication of high-speed data, include parameters for controlling the bandwidth allowed for a user. A bandwidth control parameter is referred to as Aggregate Maximum Bit Rate (AMBR). AMBR defines the maximum possible bit rate allowed for a particular LTE user for all of their "best effort" or non-guaranteed bit rate data services so that the user cannot hog the available bandwidth from the other LTE users. Different AMBR values can be used by the LTE such as, for example, UE-AMBR, the maximum possible bit rate configured by the LTE operator for a particular LTE user equipment (UE) or customer device, for their best effort services; and APN-AMBR, the maximum possible bit rate configured by the LTE operator for a particular LTE user for their best effort services on one particular packet data network as defined by an access point name (APN).

However, even with assigned bandwidths, a customer with unlimited allowed data may need to be allowed a limited bandwidth after a certain data usage threshold is reached. For example, when a customer with unlimited data plan exceeds 5 Gigabytes of data usage during a billing cycle (e.g., a month) the network provider may introduce setting to limit data usage for that customer for the remainder of the billing cycle and resume providing the full bandwidth to the user when the billing cycle is reset and a new billing cycle is started (e.g., end of the month). The intentional slowing of data service (e.g., via the Internet) is referred to as bandwidth throttling. Bandwidth throttling is a reactive measure employed in communication networks to regulate network traffic and minimize bandwidth congestion. Bandwidth throttling can occur at different locations on the network. For example, on a local area network (LAN), a system admin may employ bandwidth throttling to help limit network congestion and server crashes. On a broader level, the Internet service provider may use bandwidth throttling to help reduce a user's usage of bandwidth that is supplied to the local network.

Bandwidth throttling can be used to actively limit a user's upload and download rates on programs such as video streaming, and file sharing applications, as well as even out the usage of the total bandwidth supplied across all users on the network. Bandwidth throttling is also often used in Internet applications, in order to spread a load over a wider network to reduce local network congestion, or over a number of servers to avoid overloading individual servers, and so reduce their risk of crashing, and gain additional revenue by compelling users to use more expensive pricing schemes where bandwidth is not throttled.

Reference now is made in detail to the examples illustrated in the accompanying drawings and discussed below. FIG. 1 illustrates a high-level functional block diagram of a data service provider 100 providing data services to customers, where bandwidth throttling is applied. The network 100 illustrated in FIG. 1 includes an Online Charging System (OCS) 101, a Policy and Charging Rules Function (PCRF) 103, and a Policy and Charging Enforcement Function (PCEF) 105. The PCEF 105 is included in a Gateway (PGW 107).

The PCRF 103 is a dedicated policy functional entity that provides necessary policy functions for bandwidth and charging of customers on multimedia networks. The PCEF 105 is the functional entity which includes policy enforcement along with data flow based charging functionalities. This functional element is located at the Gateway 107 and is responsible of providing controller functions in traffic handling and Quality of Service (QoS) at PGW 107 over the user plane traffic, and providing service data flow detection, including online and offline different charging interactions. QoS refers to certain characteristics of a data link connection as observed between the connection endpoints. QoS describes the specific aspects of a data link connection that are attributable to the data service provider. The PCRF 103 is designed to provide network control relating to the service data flow detection, QoS, and flow based charging controlling to the PCEF 105, whereas PCEF 105 basically provides user traffic handling and QoS at PGW 107.

The service provider 100 can throttle customer data for a customer device 111a-111n when a data usage threshold by a customer device 111a-111n is reached. For example, the OCS 101 can notify PCRF 103 via Sy interface 113 that data usage threshold by a device 111a-111n is reached. Upon receiving the notification from OCS 101, the PCRF 103 can notify PCEF 105 within the PGW 107, via Gx interface 115, to enforce a lower APN-AMPR for device 111a-111n.

However, at the end of a billing cycle, the initial APN-AMBR associated with the service defined for device 111a-111n should be resumed. When the end of a billing cycle is approaching, the OCS 101 can notify the PCRF 103 via Sy interface 113 that end of the billing cycle is approaching. Upon receiving the notification, the PCRF 103 can send a Gx message via Gx interface 115 to the PCEF 105 at the billing cycle reset time to change the APN-AMBR to the initial bit rate and resume the service with the speed assigned to device 111a-111n.

At the billing cycle reset time (when a validity time expires), potentially high volume of Gx messages may be exchanged between the PCRF 103 and PGW 107. The reason is that the existing Gx standards do not provide a mechanism to set command level QoS parameters to take effect at a future time (e.g., at the start of a new billing cycle).

In one implementation of the disclosure, a mechanism for pre-setting the command level QoS parameters is provided, such that the pre-set parameters can be activated at a future time when predefined conditions are met, for example, at the start of a new billing cycle. As a result, traffic due to excessive exchange of Gx messages between the PCRF 103 and the PGW 107 can be avoided. The disclosed mechanism can notify the PGW 107 ahead of time to avoid potential message storm.

Although the communication network is described to be an LTE network in the present application, it may be applicable to other types of networks. The customer devices 111a-111n may be capable of voice telephone communications through the network 109, and for accessing applications and services provided by various application servers (not shown). The exemplary devices 111a-111n are capable of data communications through the particular type of network 109 (and the users thereof typically will have subscribed to data service through the network). The customer devices 111a-111n are also capable of establishing radio communications such as Near Field Communication (NFC) with each other and with other devices.

Customer devices 111a-111n can take the form of portable handsets, smartphones or personal digital assistants, although they may be implemented in other form factors. Program applications, provided by the service provider 100 to the customer devices 111a-111n can be configured to execute on many different types of customer devices 111a-111n. For example, a mobile device application can be written to execute on a binary runtime environment for (BREW-based) mobile device, a Windows Mobile based mobile device, Android, I-Phone, Java Mobile, or RIM based mobile device such as a BlackBerry or the like. Some of these types of devices can employ a multi-tasking operating system.

The communication network 109 can be implemented by a number of interconnected networks. Hence, the overall network illustrated in FIG. 1 may include a number of radio access networks (RANs), as well as regional ground networks interconnecting a number of RANs and a wide area network (WAN) interconnecting the regional ground networks to core network elements. A regional portion of the network 10, such as that serving customer devices 111a-111n, can include one or more RANs and a regional circuit and/or packet switched network and associated signaling network facilities.

Physical elements of a RAN operated by one of the mobile service providers or carriers include a number of base stations (not shown). A base station can include a base transceiver system (BTS), which can communicate via an antennae system at the site of base station and over the airlink with one or more of the customer devices 111a-111n, when the customer devices are within range. Each base station can include a BTS coupled to several antennae mounted on a radio tower within a coverage area often referred to as a "cell." The BTS is the part of the radio network that sends and receives Radio Frequency (RF) signals to/from the customer devices 111a-111n that are served by the base station.

A customer device 111a-111n communicates over the air with a base station and through the communication network 109 for various voice and data communications, e.g. through the Internet (not shown with a service provider 100). To insure that the data services offered by the service provider 100, are available to only authorized devices/users, the providers of the services may also deploy an authentication service. For example, the service provider 100 may request from the user to enter a password, a biometric input such as a fingerprint, etc. and compare the entry with a password or biometric input on file in a memory location of the service provider 100, prior to allowing the user of the customer device 111a-111n to proceed with receiving a service.

Figure 2:
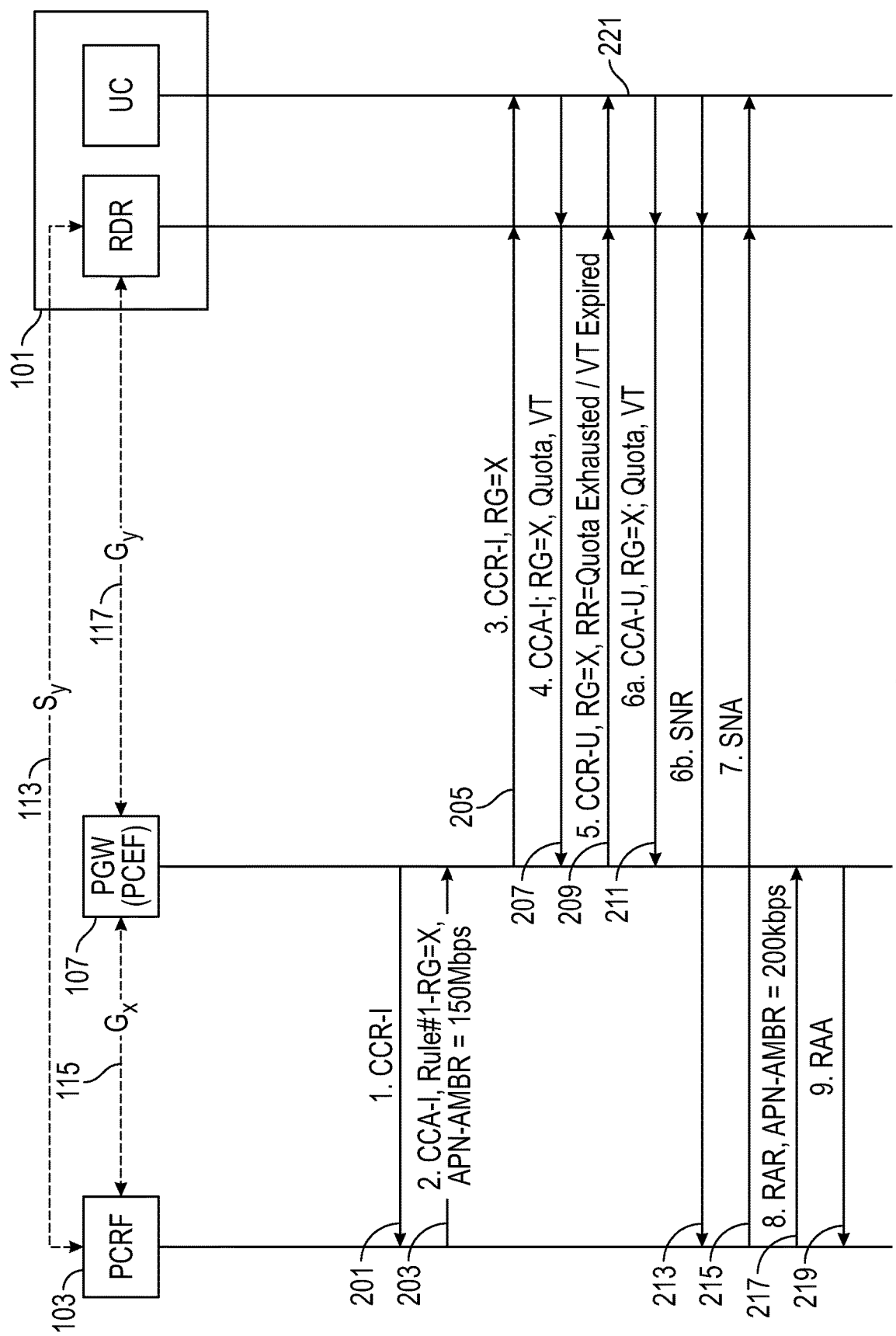
FIG. 2 illustrates an exemplary process of bandwidth throttling by a data service provider, based on a usage threshold.

FIG. 2 illustrates an exemplary process of bandwidth throttling by a data service provider, based on a data usage threshold. The process of FIG. 2 is explained herein using the example scenario as discussed with regards to FIG. 1. In this example, it is assumed that a user of a customer device 111a-111n is subscribed to a data service provided by the service provider 100 of FIG. 1. The customer device 111a-111n may be subscribed for an unlimited data service. The service provider 100 may provide data to customer devices 111a-111n with an APN-AMBR value of, for example, 150 Megabytes per second.

However, the service provider 100 may apply bandwidth throttling such that when the customer device 111a-111n reaches a 5 Gigabytes data usage threshold, a reduced APN-AMBR of, for example, 200 Kilobytes per second is enforced until the end of the current billing cycle. Upon starting a new billing cycle, the APN-AMBR is reset to the initial 150 Megabytes per second. As illustrated in FIG. 2, at step 201, the PGW 107 sends an inquiry for the allowed bit rate associated with the customer device 111a-111n to the PCRF 103 and at step 203 the PGW 107 receives the APN-AMBR value 150 Megabytes per second from the PCRF 103.

Upon receiving the APN-AMBR, at step 205, the PGW 107 sends a request for a quota for the customer device 111a-111n to the OCS 101. The quota may include all of the remaining data assigned to the customer device 111a-111n or may include slice of the remaining data assigned to the customer device 111a-111n until the data usage threshold for the customer device 111a-111n is reached. For example, if the data usage threshold is 5 Gigabytes and the customer device 111a-111n has already used 4.5 Gigabytes of data during the current billing cycle, the quota for the customer device 111a-111n may be 0.5 Gigabytes. Alternatively, the quota may be a slice of 0.5 Gigabytes (e.g., 0.3 Gigabytes). At step 207, the PGW 107 receives the quota and a validity time (VT) from the OCS 101 (e.g., 0.5 Gigabytes). In response to receiving the quota form the OCS 101, the PGW 107 can provide data to the customer device 111a-111n based on the APN-AMBR (e.g., 150 Megabytes per second) via the communication network 109

Once either the quota is exhausted or the validity time has expired, the PGW 107 may send another request for quota to the OCS 101 as illustrated in Step 209. In response, the PGW 107 may receive an updated quota and/or an updated validation time. The PGW 107 may repeatedly send the remaining quota request to OCS 101 and receive the updated quota, until the data usage threshold of 5 Gigabytes is reached (shown as 221).

The PGW 107 may monitor data usage by the customer device 111a-111n and determine the used quota based on the monitoring. Alternatively, the PCRF 103 may receive a notification from the OCS 101 indicating that the data usage threshold is reached. Subsequently, the PCRF 103 can send a notification of the data usage threshold reaching to the PGW 107. When the data usage threshold is reached, at point 221, additional quota may be granted to the customer device 111a-111n via the OCS 101 at step 211. At point 221, the OCS 101 may set a parameter indicating that the data usage threshold for customer device 111a-111n is reached.

Upon reaching the data usage threshold, at step 213, the OCS 101 sends a spending status notification request (SNR) for the customer device 111a-111n to PCRF 103. The SNR may include policy counter status (e.g., spending status) for the customer device 111a-111n. Upon receiving the notification from OCS 101, the PCRF 103 may reduce the APN-AMBR for the customer device 111a-111n, and at step 215 the PCRF 103 provides an answer to the SNR (SNA) to the OCS 101 indicating receipt of the SNR.

At step 217, the PGW 107 receives a reduced APN-AMBR (e.g., 200 Kilobytes per second) from the PCRF 103 for the customer device 111a-111n. In response to receiving the reduced APN-AMBR, the PGW 107 may send an answer to PCRF 103, per step 219, indicating receipt of the reduced APN-AMBR. The PGW 107 may continue providing data to the customer device 111a-111n based on the reduced APN-AMBR of 200 Kilobytes per second until the end of the current billing cycle. However, according to the known standards of the Gx interface 115, at the end of the billing cycle, the PCRF 103 has to send a notification messages to the PGW 107 via the Gx interface 115 to notify the PGW 107 to reset the APN-AMBR to the initial value of 150 Megabytes per second. Since the PCRF 103 has to send the end of billing cycle notifications for multiple customer devices 111a-111n, excessive number of notifications may cause excessive traffic on the Gx interface 115.

In one implementation of the disclosure, the PGW 107 uses a predefined activation time to provide data to the customer device 111a-111n based on the reduced APN-AMBR. When the predefined activation time is reached, the PGW 107 may reset the APN-AMBR for the customer device 111a-111n to the initial value of 150 Megabytes per second or to a new APN-AMBR provided by the PCRF 103. The PGW 107 may receive a new APN-AMBR from the PCRF 103 at the start of a new billing cycle to resume providing data to the customer device 111a-111n based on the new APN-AMBR. A typical process for the high speed data service resumption is further discussed with regards to FIG. 3.

Figure 3:
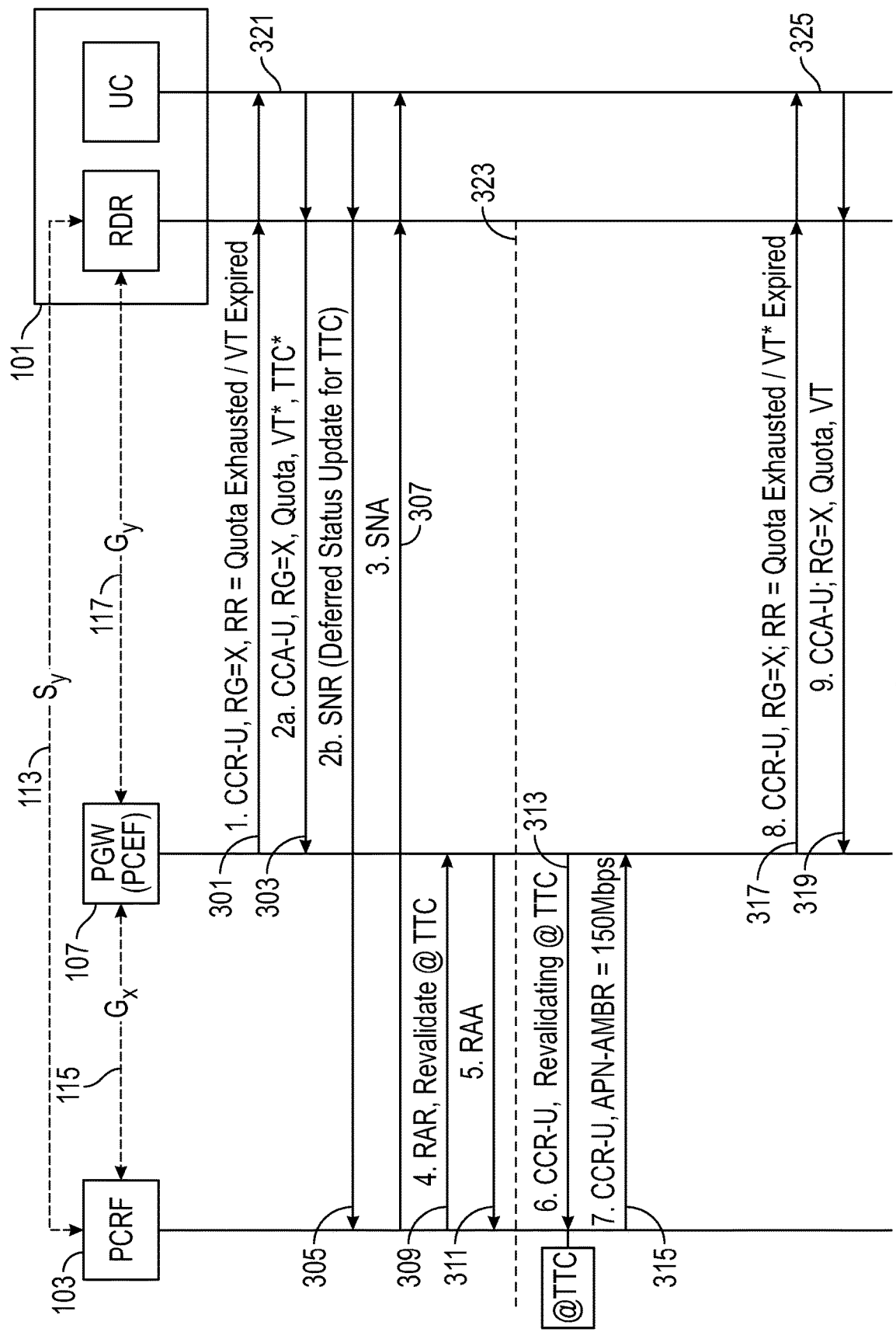
FIG. 3 illustrates an exemplary process of resuming high speed data service at start of a new billing cycle, according to one implementation.

FIG. 3 illustrates an exemplary process of resuming high speed data service at start of a new billing cycle, according to one implementation. It is assumed that the process of FIG. 3 follows the process of FIG. 2. For example, step 301 may be the next step following the step 219 of FIG. 2. At steps 301 and 303, the PGW 107 may repeatedly send requests for remaining quota for the customer device 111a-111n to the OCS 101 and receive updated quota from OCS 101, until the OCS 101 at point 321 determines that a billing cycle reset is approaching. Upon the determination of the billing cycle reset time, at step 305 the OCS 101 sends a spending notification request for the customer device 111a-111n to the PCRF 103. The spending notification request may include policy counter status for the customer device 111a-111n. At step 307, the PCRF 103 sends an answer to the request to OCS 101. The policy counter status may indicate that the APN-AMBR associated with the customer device 111a-111n is at the start of the new billing cycle.

At step 309, prior to the start of a new billing cycle (shown as 323) the PGW 107 receives a revalidation notification from the PCRF 103 for the customer device 111a-111n. The revalidation notification includes a request for the PGW 107 to revalidate the APN-AMBR for the customer device 111a-111n at a time indicated in the notification. In response to receiving the revalidated APN-AMBR, the PGW 107 may send an answer to PCRF 103, per step 311, indicating receipt of the revalidating notification. In this example, at point 323 when a new billing cycle starts (e.g. at the midnight of the last day of a current billing cycle) the PGW 107 can start providing data to the customer device 111a-111n based on the revalidated APN-AMBR.

Upon start of the new billing cycle, at step 313 the PGW 107 can send a request for the new APN-AMBR to the PCRF 103 and at step 315 the PGW 107 receives the new value (e.g., 150 Megabytes per second) for the APN-AMBR from the PCRF 103. The APN-AMBR may remain the same as the previous billing cycle (e.g., 150 Megabytes per second). Alternatively, a new APN-AMBR may be introduced for the new billing cycle. For example, a data plan for the customer device 111a-111n may have been updated during the previous billing cycle and the updates may be effective at the start of the new billing cycle. In such cases, the PCRF 103 may provide, at step 315, an updated APN-AMBR for the new data plan for the customer device 111a-111n to the PGW 107.

At steps 317 the PGW 107 sends a request for remaining quota for the customer device 111a-111n to the OCS 101. Upon receiving the first request 317 in the new billing cycle, the OCS 101 can reset the parameter that was set at point 221 of FIG. 1 indicating that the data usage threshold is reached to indicate that the data usage threshold is not reached (shown as point 325).

The PGW 107 may repeatedly send requests for remaining quota for the customer device 111a-111n to the OCS 101 (317) and receive updated quota from OCS 101 (319). For example, the PGW 107 can repeatedly send credit control requests (CCRs) to OCS requesting additional quota. As previously discusses, OCS can send additional quota and VT (validity time) in a credit control answer (CCA) to the PGW 107. Once the additional quota is exhausted or VT expires, PGW 107 sends another CCR-U to OCS. PGW 107 can determine whether the quota granted in CCA is used by the customer device 111a-111n or the VT is expired. The VT may indicate a time interval, upon expiration of which the PGW 107 should request a status update of data usage by the customer device 111a-111n from the OCS 101.

Figure 4:
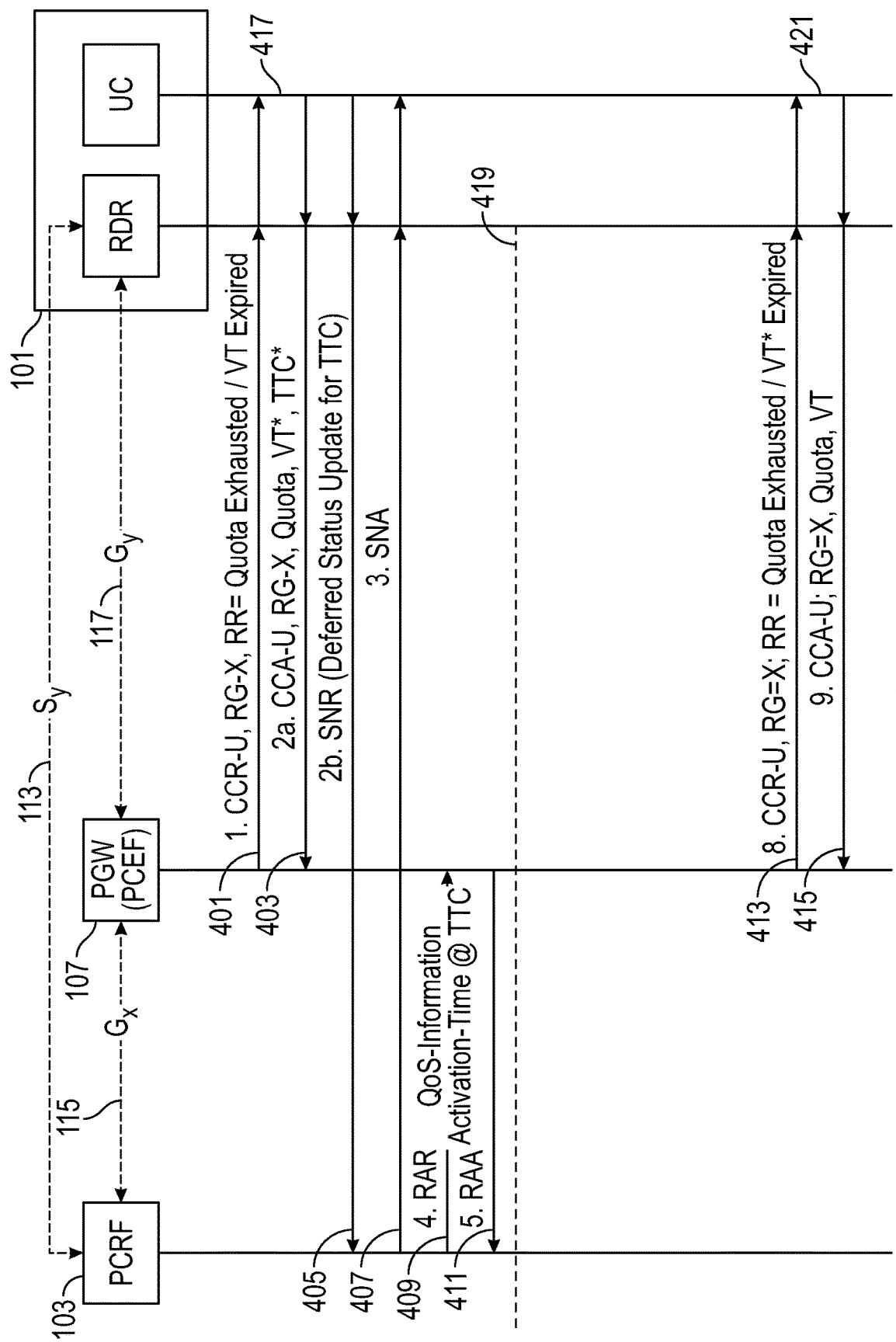
FIG. 4 illustrates an exemplary process of resuming high speed data service at start of a new billing cycle, according to another implementation.

FIG. 4 illustrates an exemplary process of resuming high speed data service at start of a new billing cycle, according to another implementation. It is assumed that the process of FIG. 4 follows the process of FIG. 2. For example, step 401 may be the next step following the step 219 of FIG. 2. At steps 401 and 403, the PGW 107 may send a request for remaining quota for the customer device 111a-111n to the OCS 101 and receive updated quota from OCS 101. The OCS 101 may determine, at point 417, that a billing cycle reset is approaching. Upon the determination of the billing cycle reset time, at step 405, the OCS 101 sends a spending notification request for the customer device 111a-111n to the PCRF 103. The spending notification request may include policy counter status for the customer device 111a-111n. At step 407, the PCRF 103 sends an answer to the request to OCS 101. The policy counter status may indicate the APN-AMBR associated with the customer device 111a-111n at the start of the new billing cycle.

At step 409, prior to the start of a new billing cycle (shown as 419) the PGW 107 receives QoS information for the customer device 111a-111n from PCRF 103. The start of billing cycle 419 may be different for different customer devices 111a-111n. For example, for one customer device 111a-111n the billing cycle may start on the first day of each month while for another customer device 111a-111n the billing cycle may start on the $10^{th}$ day of the month. The QoS information may include a priority parameter for the customer device 111a-111n to prioritize the customer device 111a-111n over other customer devices 111a-111n during the time of high congestion in the network. The QoS information may also include a condition which when satisfied may give the customer device 111a-111n a higher priority over other customer devices 111a-111n. For example, the condition may include a date, a time, a time/date duration, etc. In one implementation, the QoS information may include an activation-time, such that the PGW 107 can enforce the APN-AMBR for the customer device 111a-111n at the activation time.

The step 409 at which the PCRF 103 sends the QoS information to PGW 107 can be pre-scheduled for each customer device 111a-111n based on the start of the billing cycle for that customer device. For example the step 409 may be performed one hour, two hours, 24 hours, etc. prior to start of the new billing cycle. The PCRF 103 may set the activation-time to the billing cycle reset time, include a new QoS parameters in the reauthorization request (RAR) and send it to PGW 107. The PGW 107 can store the activation-time in a local memory and when activation-timer expires, the PGW 107 can enforce the new QoS parameters.

In response to receiving the QoS information including, for example, the activation time, the PGW 107 may send an answer to PCRF 103, per step 411, indicating receipt of the QoS information. In this example, at point 419 when a new billing cycle starts (e.g. at the midnight of the last day of a current billing cycle), the PGW 107 can start providing data to the customer device 111a-111n based on the QoS information received from the PCRF 103.

However, since the PGW 107 has received the activation time from PCRF 103 at step 409, sending a request for the new APN-AMBR to the PCRF 103 (shown in step 313 of FIG. 3) and receiving the new value for the APN-AMBR from the PCRF 103 (shown at step 315 of FIG. 3) can be omitted. Since a large number of customer devices 111a-111n may use the data services provided by the service provider 100, omitting messages of steps 313 and 315 for each customer device 111a-111n can noticeably reduce the network traffic.

The activation time can be set by the PCRF 103 using a new optional function such as, for example an Attribute-Value Pair (AVP) added into the Gx interface 115 standard. The new function can provide a flexible way for the PCRF 103 to set the activation time for the QoS parameters. Similarly, a deactivation-time can be also determined using another new optional function such as, for example, AVP added into the Gx interface 115 standard. Although not shown in FIG. 4, the PCRF 103 can send the deactivation-time to the PGW 107 at any occasion when a change in the APN-AMBR for the customer device 111a-111n is needed. For example, at a congested time of the network, a policy in the PCRF 103 may require that the APN-AMBR for a customer device 111a-111n be reduced from a default 150 Megabytes per second to a reduced 100 Megabytes per second for a period of time (an hour, a day, etc.). In this case, the PCRF 103 can send a deactivation time to PGW 107 indicating the start time for the reduced APN-AMBR and a deactivation-time indicating the end of the reduced APN-AMBR and start of the default APN-AMBR.

At steps 413 the PGW 107 sends a request for remaining quota for the customer device 111a-111n to the OCS 101. Upon receiving the first request 413 in the new billing cycle, the OCS 101 can reset the parameter that was set at point 221 of FIG. 1 indicating that the data usage threshold is reached to indicate that the data usage threshold is not reached (shown as point 421).

The PGW 107 may send requests for remaining quota for the customer device 111a-111n to the OCS 101 (413) and receive updated quota and validity time from OCS 101 (415). The PGW 107 can provide data access to the customer device 111a-111n until the updated quota is exhausted or the validity time has expired. In response, the PGW 107 may send a request for remaining quota to OCS 101 and receive another updated quota and validity time. This process may continue until the data usage threshold (e.g., 5 Gigabytes) is reached. The PGW 107 may receive a notification from OCS 101 indicating that the data usage threshold is reached. In some cases, the PCRF 103 may also receive a notification from the OCS 101 indicating that the data usage threshold is reached. Subsequently, the PCRF 103 can send a notification of the data usage threshold reaching to the PGW 107. Additionally or alternatively, the PGW 107 may itself monitor data usage by the customer device 111a-111n and determine the remaining quota based on the monitoring.

As previously discussed, in one implementation, the PCRF 103 can determine an activation-time and a deactivation-time for the APN-AMBR of a customer device 111a-111n based on the QoS information and data usage limit of the customer device. Example (1) illustrates a sample of new optional functions added into the Gx interface 115 standard for determining the activation-time and the deactivation-time by the PCRF 103. These example AVPs provide information on when the QoS parameters would be activated or deactivated.

[V] [M] QoS-Information:
[V] APN-Aggregate-Max-Bit rate-DL: 75000000
[V] APN-Aggregate-Max-Bit rate-UL: 75000000
[O] Activation-Time
[O] Deactivation-Time Example (1)

The AVPs in example (1) determine the default value for the APN-AMBR as 75 Megabytes per second at Downlink traffic (DL) and 75 Megabytes per second at Uplink traffic (UL). In addition, the AVPs of example 1 determine an activation-time and deactivation-time for the PGW 107 for setting a time for activation or deactivation of the APN-AMBR of the 75 Megabytes per second.

In another implementation, the PCRF 103 may determine an activation-time and a deactivation-time for the APN-AMBR of a customer device 111a-111n based on a QoS class identifier (OCI). The QCI can define a priority level for the customer device 111a-111n with respect to other customer devices 111a-111n. Using the priority level, the PGW 107 can provide data to the customer device with higher priority before providing data to the customer device with lower priority level.

The QCI can be an integer from 1 to 9, indicating 9 different QoS performance characteristics of each network data packet. QCI values are standardized to reference specific QoS characteristics, and each QCI contains standardized performance characteristics (values), such as resource type (Guaranteed Bit rate GBR or non-GBR), priority (1 to 9), Packet Delay Budget (allowed packet delay shown in values ranging from 50 milliseconds to 300 milliseconds), Packet Error Loss Rate (allowed packet loss shown in values from $10^{-2}$ to $10^{-6}$.

Example (2) illustrates a sample of new optional functions added into the Gx interface 115 standard for determining the activation-time and the deactivation-time by the PCRF 103 based on the priority level. These example AVPs provide information on when the QoS, QCI parameters and application and retention priorities (ARP) would be activated or deactivated. The PGW 107 can use ARP values to manage the allocation and retention of resources for data services provided.

[V] Default-EPS-Bearer-QoS:
[V] [M] QoS-Class-Identifier: QCI_9 (9)
[V] Allocation-Retention-Priority:
[V] Priority-Level: 10
[V] Pre-emption-Capability: PRE-EMPTION_CAPABILITY_DISABLED (1)
[V] Pre-emption-Vulnerability: PRE-EMPTION_VULNERABILITY_DISABLED (1)
[O] Activation-Time
[O] Deactivation-Time Example (2)

The aggregate maximum bit rate (AMBR) defines the maximum allowed throughput for a customer device 111a-111n based on the sum of all total bit rates that all non-GBR data services associated with an access point name (APN) are allowed to use. Thus, the AMBR limits the total non-GBR traffic for an APN. In example (2), the QCI parameter value 9 and priority level 10 is assigned to the customer device 111a-111n. The pre-emption-capability and the pre-emption-vulnerability are disabled in this example. The pre-emption can be enabled for the PGW 107 to evaluate the priority level, pre-emption-vulnerability, and preemption-capability flags to determine whether a data service is a candidate for deletion.

The pre-emption-capability AVP defines whether a service data flow can get resources that were already assigned to another service data flow with a lower priority level. The pre-emption-capability can have a value (0) or "enabled" or a value (1) or disabled. The enabled value (0) indicates that the service data flow is allowed to get resources that were already assigned to another service data flow with a lower priority level. The disabled values (1) indicates that the service data flow is not allowed to get resources that were already assigned to another service data flow with a lower priority level.

The pre-emption-vulnerability AVP defines whether a service data flow can lose the resources assigned to it in order to admit a service data flow with higher priority level. The pre-emption-vulnerability can have a value (0) or "enabled" or a value (1) or disabled. The enabled value (0) indicates that the resources assigned to the service data flow can be pre-empted and allocated to a service data flow with a higher priority level. The disabled values (1) indicates that the resources assigned to the service data flow shall not be pre-empted and allocated to a service data flow with a higher priority level.

The AVPs of example 2 can be defined for each customer device 111a-111n such that the PGW 107 can determine which customer device to provide data service to, based on a comparison between the QCI value and priority level for various customer devices requesting data service.

In another implementation, the PCRF 103 may determine an activation-time and a deactivation-time for the APN-AMBR of a customer device 111a-111n based on a conditional APN-AMBR value for the customer device 111a-111n. For example, a condition may be defined by policy makers or by the service provider to update the APN-AMBR for one or more customer devices 111a-111n based on that condition. The conditional APN-AMBR may be applied to radio access technology (RAT-Type) AVPs or enumerated, connectivity access network (IPCAN-Type) AVPs. The condition may include a time of the day, a day of the month, a specific date, a location of the customer device, a data plan of the customer device, etc. Using the condition, the PGW 107 can provide data to the customer device based on whether the condition holds or do not hold.

Example (3) illustrates a sample of new optional functions added into the Gx interface 115 standard for determining the activation-time and the deactivation-time by the PCRF 103 based on a conditional APN-AMBR. These example AVPs provide information on when the QoS, QCI parameters and application and retention priorities (ARP) would be activated or deactivated. The PGW 107 can use ARP values to manage the allocation and retention of resources for data services provided.

Conditional-APN-Aggregate-Max-Bit rate:
    APN-Aggregate-Max-Bit rate-DL: 75000000
    APN-Aggregate-Max-Bit rate-UL: 75000000
    RAT-Type: EUTRAN
    [O] Activation-Time
    [O] Deactivation-Time Example (3)

The Example (3) indicates that, if RAT-Type is Evolved Universal Terrestrial Radio Access Network (EUTRAN), the PGW 107 should enforce an APN-AMBR of 75000000.

The structure, programming and operations of the various types of mobile devices are well known. However, for completeness, it may be useful to consider the functional elements/aspects of two exemplary customer devices 111a-111n, at a high-level.

Figure 5:
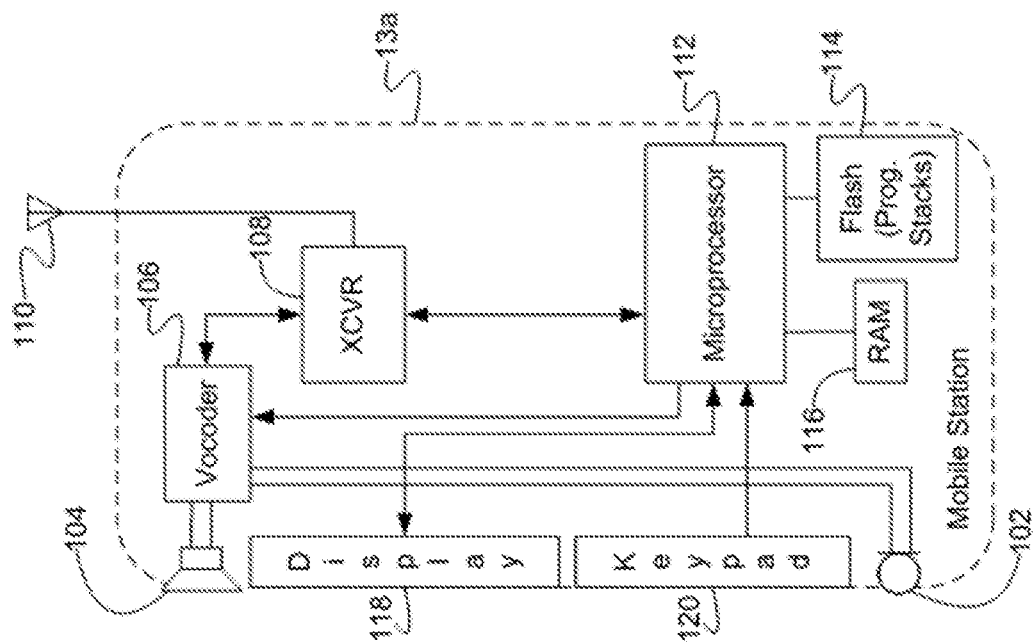
FIG. 5 is a high-level functional block diagram of an exemplary non-touch type mobile device that may utilize the enforced quality of service parameters through a network/system like that shown in FIG. 1.

For purposes of such a discussion, FIG. 5 is a high-level functional block diagram of an exemplary non-touch type mobile device (e.g., customer device 111a-111n) that may utilize the enforced quality of service parameters through a network/system like that shown in FIG. 1. Although the customer device 111a-111n may be a smart-phone or may be incorporated into another device, such as a personal digital assistant (PDA) or the like, for discussion purposes, the illustration shows the customer device 111a-111n is in the form of a handset. The handset implementation of the customer device 111a-111n functions as a normal digital wireless telephone station. For that function, the station 111a-111n includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 111a-111n also includes at least one digital transceiver (XCVR) 108. Today, the handset 111a-111n would be configured for digital wireless communications using one or more of the common network technology types. The concepts discussed here encompass implementations of the customer device 111a-111n utilizing any digital transceivers that conform to current or future developed digital wireless communication standards. The customer device 111a-111n may also be capable of analog operation via a legacy network technology.

The transceiver 108 provides two-way wireless communication of information, such as vocoded speech samples and/or digital information, in accordance with the technology of the network 109. The transceiver 108 also sends and receives a variety of signaling messages in support of the various voice and data services provided via the customer device 111a-111n and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

The customer device 111a-111n includes a display 118 for displaying messages, menus or the like; call related information dialed by the user, calling party numbers, etc. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course, other user interface elements may be used, such as a trackball, as in some types of PDAs or smart phones.

In addition to normal telephone and data communication related input/output (including message input and message display functions), the user interface elements also may be used for display of menus and other information to the user and user input of selections, including any needed during the process for enforcing quality of service parameters.

A microprocessor 112 serves as a programmable controller for the customer device 111a-111n, in that it controls all operations of the customer device 111a-111n in accord with programming that it executes, for all normal operations, and for operations involved in the enforced quality of service parameters under consideration here. In the example, the customer device 111a-111n includes flash type program memory 114, for storage of various "software" or "firmware" program routines and mobile configuration settings, such as mobile directory number (MDN) and/or mobile identification number (MIN), etc. The customer device 111a-111n may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

Figure 6:
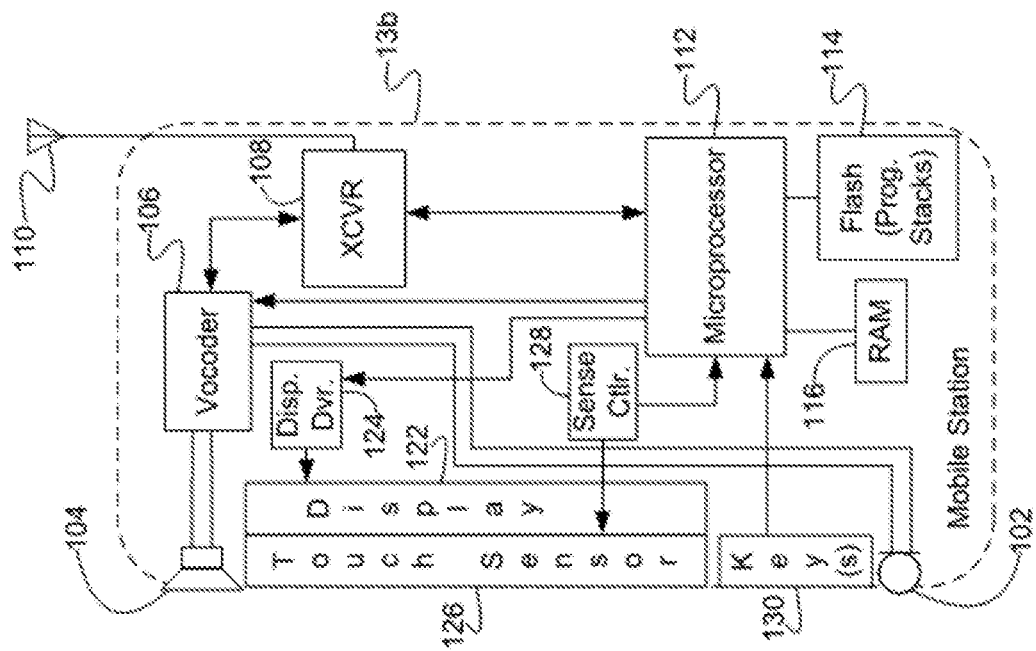
FIG. 6 is a high-level functional block diagram of an exemplary touch screen type mobile device that may utilize the enforced quality of service parameters through a network/system like that shown in FIG. 1.

For purposes of such a discussion, FIG. 6 is a high-level functional block diagram of an exemplary touch screen type mobile device (e.g., customer device 111a-111n) that may utilize the enforced quality of service parameters through a network/system like that shown in FIG. 1. Although possible configured somewhat differently, at least logically, a number of the elements of the exemplary touch screen type customer devices 111a-111n are similar to the elements of customer device 111a-111n, and are identified by like reference numbers in FIG. 6. For example, the touch screen type customer devices 111a-111n includes a microphone 102, speaker 104 and vocoder 106, for audio input and output functions, much like in the earlier example. The customer devices 111a-111n also includes at least one digital transceiver (XCVR) 108, for digital wireless communications, although the handset 111a-111n may include an additional digital or analog transceiver. The concepts discussed here encompass implementations of the customer devices 111a-111n utilizing any digital transceivers that conform to current or future developed digital wireless communication standards. As in the station 111a-111n, the transceiver 108 provides two-way wireless communication of information, such as vocoded speech samples and/or digital information, in accordance with the technology of the network 109. The transceiver 108 also sends and receives a variety of signaling messages in support of the various voice and data services provided via the customer devices 111a-111n and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

As in the example of station 111a-111n, a microprocessor 112 serves as a programmable controller for the customer devices 111a-111n, in that it controls all operations of the customer devices 111a-111n in accord with programming that it executes, for all normal operations, and for operations involved in the procedure for enforcing quality of service parameters under consideration here. In the example, the customer devices 111a-111n includes flash type program memory 114, for storage of various program routines and mobile configuration settings. The customer devices 111a-111n may also include a non-volatile random access memory (RAM) 116 for a working data processing memory. Of course, other storage devices or configurations may be added to or substituted for those in the example. Hence, outlined above, the customer devices 111a-111n includes a processor, and programming stored in the flash memory 114 configures the processor so that the mobile device is capable of utilizing enforced quality of service parameters.

In the example of FIG. 6, the user interface elements included a display and a keypad. The customer devices 111a-111n may have a limited number of key 130, but the user interface functions of the display and keypad are replaced by a touch screen display arrangement. At a high level, a touch screen display is a device that displays information to a user and can detect occurrence and location of a touch on the area of the display. The touch may be an actual touch of the display device with a finger, stylus or other object, although at least some touch screens can also sense when the object is in close proximity to the screen. Use of a touch screen display as part of the user interface allows a user to interact directly with the information presented on the display.

Hence, the exemplary customer devices 111a-111n includes a display 122, which the microprocessor 112 controls via a display driver 124, to present visible outputs to the device user. The customer devices 111a-111n also includes a touch/position sensor 126. The sensor 126 is relatively transparent, so that the user may view the information presented on the display 122. A sense circuit 128 sensing signals from elements of the touch/position sensor 126 and detects occurrence and position of each touch of the screen formed by the display 122 and sensor 126. The sense circuit 128 provides touch position information to the microprocessor 112, which can correlate that information to the information currently displayed via the display 122, to determine the nature of user input via the screen.

The display 122 and touch sensor 126 (and possibly one or more keys 130, if included) are the physical elements providing the textual and graphical user interface for the customer devices 111a-111n. The microphone 102 and speaker 104 may be used as additional user interface elements, for audio input and output, including with respect to some functions related to the enforcement of quality of service parameters.

The structure and operation of the customer devices 111a-111n, as outlined above, were described by way of example, only. As shown by the above discussion, functions relating to the enforced quality of service parameters, via a graphical user interface of a mobile device may be implemented on computers connected for data communication via the components of a packet data network, operating as shown in FIG. 1. Although special purpose devices may be used, such devices also may be implemented using one or more hardware platforms intended to represent a general class of data processing device commonly used to run "server" programming so as to implement the enforced quality of service parameters functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for enforcing quality of service parameters. The software code is executable by the general-purpose computer that functions as the gateway for enforcing quality of service parameters and/or that functions as a user terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for enforcing quality of service parameters, in essentially the manner performed in the implementations discussed and illustrated herein.

Figure 7:
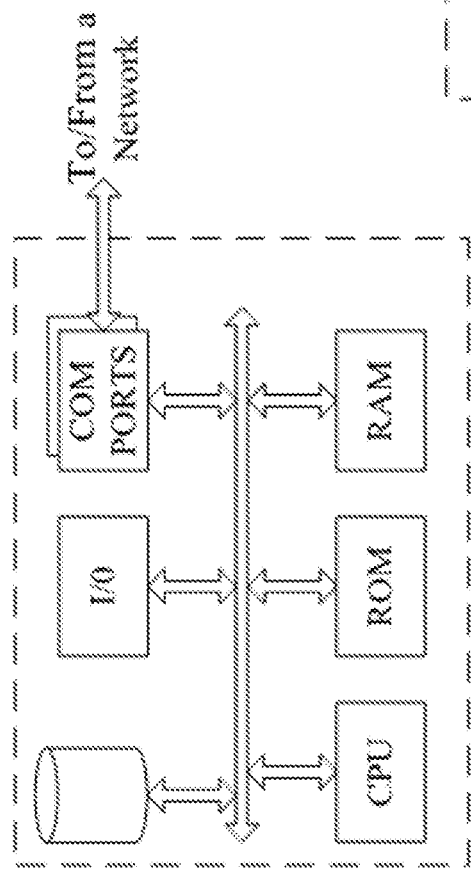
FIG. 7 is a simplified functional block diagram of an exemplary computer that may be configured as a host or server.
Figure 8:
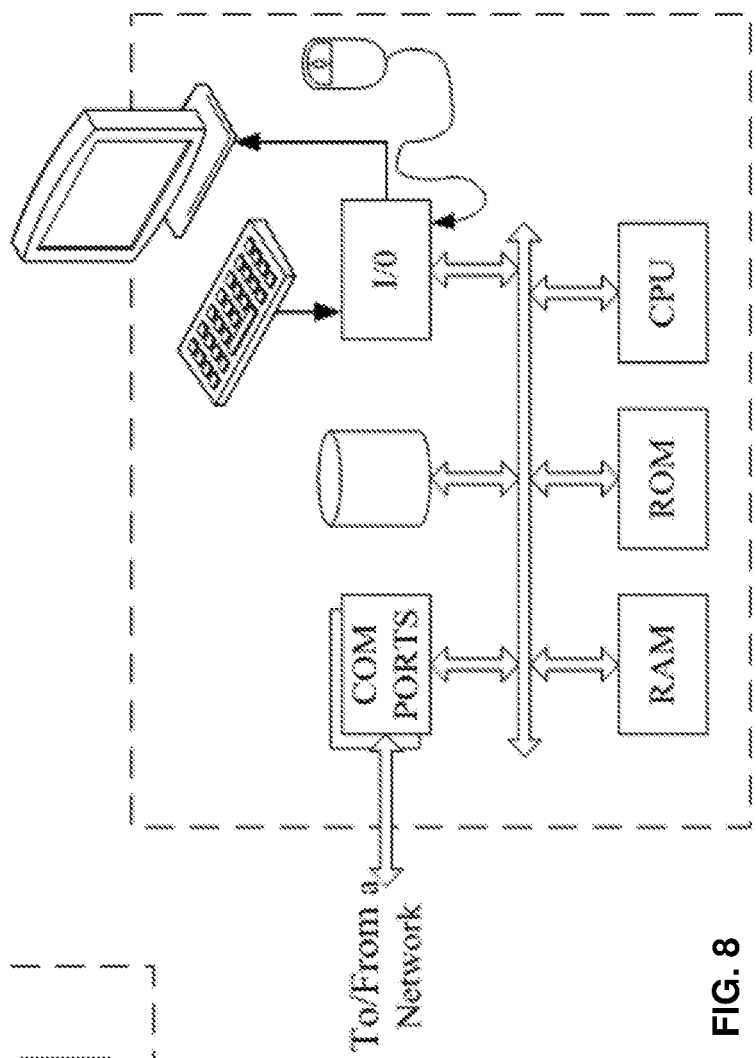
FIG. 8 is a simplified functional block diagram of an exemplary personal computer or customer device.

FIGS. 7 and 8 provide functional block diagram illustrations of general purpose computer hardware platforms. FIG. 7 illustrates a network or host computer platform, as may typically be used to implement a server. FIG. 8 depicts a computer with user interface elements, as may be used to implement a personal computer or other type of work station or terminal device, although the computer of FIG. 8 may also act as a server if appropriately programmed. The structure, programming and general operation of such computer equipment are well known and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 8). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the methods of providing enforced quality of service parameters outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement enforcing of quality of service parameters, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A method comprising:
   receiving, at a gateway and from a mobile device, a request for data usage, wherein the request is received at the gateway over a communication network;
   in response to receiving the request for data usage, sending from the gateway to a controller an inquiry for an allowed bit rate associated with the mobile device;
   in response to sending the inquiry for the allowed bit rate, receiving at the gateway, a first bit rate value as the allowed bit rate associated with the mobile device;
   upon receiving the first bit rate value, sending from the gateway to a charging system a request for a quota associated with the mobile device, wherein the quota indicates an amount of data the mobile device is allowed to use;
   in response to the request for the quota associated with the mobile device, receiving at the gateway the quota from the charging system;
   in response to receiving the quota from the charging system, enabling the mobile device to access data on the communication network based on the first bit rate value until the quota is reached;
   subsequent to the quota being reached, identifying that a data usage threshold is reached;
   subsequent to identifying that a data usage threshold is reached, receiving, at the gateway and from the controller, a second bit rate value as the allowed bit rate associated with the mobile device;
   in response to receiving the second bit rate value, enabling the mobile device to access data on the communication network based on the second bit rate value until a predefined activation time is reached; and
   resetting the second bit rate value for the mobile device to the first bit rate value when the predefined activation time is reached,
   wherein identifying that a data usage threshold is reached comprises receiving, at the gateway and from the controller, a first notification indicating that the data usage threshold is reached, the first notification being responsive to a second notification received at the controller from the charging system indicating that the data usage threshold is reached.

2. The method of claim 1, wherein:
   receiving the quota from the charging system includes, receiving at the gateway, quota and a validity time for usage of the quota by the mobile device from the charging system, the quota including a slice of a remaining available quota associated with the mobile device until the data usage threshold is reached, the method further comprising:
   sending from the gateway to the charging system a request for an updated quota once the quota is reached;
   in response to the request for the updated quota, receiving at the gateway and from the charging system, the updated quota, the updated quota corresponding to the remaining available quota associated with the mobile device until the data usage threshold is reached; and
   in response to receiving the updated quota from the charging system, enabling the mobile device to access data on the communication network based on the first bit rate value until the data usage threshold is reached.

3. The method of claim 1, wherein identifying that the data usage threshold is reached includes:
   repeatedly sending the request for the quota to the charging system, receiving the quota from the charging system, and providing data to the mobile device based on the first bit rate, until the charging system indicates that the data usage threshold is reached.

4. The method of claim 1, wherein the gateway is a Packet Data Network Gateway (PGW), the controller is a Policy Control and Charging Rules Function (PCRF), and the charging system is an Online Charging System (OCS).

5. The method of claim 4, wherein sending the inquiry from the PGW to the PCRF includes sending the inquiry via a Gx interface, sending the request from the PGW to the OCS includes sending the request via a Gy interface, and the second notification is received at the PCRF from the OCS via a Sy interface.

6. The method of claim 1, wherein sending the inquiry for the allowed bit rate includes sending the inquiry for an allowed maximum bit rate associated with the mobile device.

7. The method of claim 6, wherein the allowed maximum bit rate includes Access Point Name Aggregate maximum Bit Rate (APN-AMBR).

8. The method of claim 1, wherein the predefined activation time includes start of a new billing cycle.

9. The method of claim 1, further comprising:
   determining that a predefined deactivation time is reached; and
   upon determining that the predefine deactivation time is reached, resetting the allowed bit rate to the second bit rate value.

10. The method of claim 1, wherein resetting the second bit rate value to the first bit rate value comprises:
    receiving a revalidation notification for the mobile device, at the gateway, the revalidation notification including a request to revalidate the allowed bit rate associated with the mobile device at a time indicated in the notification; and
    providing data to the mobile device based on the revalidated allowed bit rate.

11. A method comprising:
    receiving, at a gateway and from a mobile device, a request for data usage, wherein the request is received at the gateway over a communication network;

in response to receiving the request for data usage, sending from the gateway to a controller, an inquiry for an allowed bit rate and a default priority level associated with the mobile device;

in response to sending the inquiry for the allowed bit rate and the default priority level, receiving, at the gateway, a first bit rate value as the allowed bit rate and the default priority level associated with the mobile device;

upon receiving the first bit rate value as the allowed bit rate and the default priority level, sending from the gateway to a charging system, a request for a quota associated with the mobile device, wherein the quota indicates an amount of data the mobile device is allowed to use;

in response to the request for the quota associated with the mobile device, receiving, at the gateway, the quota and a validity time from the charging system, the quota received from the charging system including a slice of a remaining available quota associated with the mobile device prior to a data usage threshold for the mobile device being reached;

in response to receiving the quota from the charging system, enabling the mobile device to access data on the communication network based on the first bit rate value and the default priority level until the quota is reached or the validity time is expired;

subsequent to the quota being reached or the validity time being expired, determining that the data usage threshold for the mobile device is reached;

upon determining the data usage threshold for the mobile device is reached, receiving, at the gateway and from the controller, a second bit rate value as the allowed bit rate and a second priority level associated with the mobile device;

enabling the mobile device to access data on the communication network based on the second bit rate value over one or more mobile devices having a lower priority level than the second priority level until a predefined activation time is reached; and when the predefined activation time is reached, resetting the second allowed bit rate value for the mobile device to the first bit rate value and resetting the second priority level to the default priority level.

12. The method of claim 11, wherein determining that the data usage threshold is reached includes:

repeatedly sending the request for the quota to the charging system, receiving the quota from the charging system, and providing data to the mobile device, until the charging system indicates that the data usage threshold is reached.

13. The method of claim 11, wherein sending the inquiry for the allowed bit rate includes sending the inquiry for an allowed maximum bit rate associated with the mobile device.

14. The method of claim 11, wherein the predefined activation time includes start of a new billing cycle.

15. The method of claim 11, further comprising receiving, at the gateway and from the controller, a plurality of quality of service (QoS) parameters for the mobile device, the plurality of QoS parameters including one or more conditions.

16. The method of claim 11, wherein resetting the second bit rate value to the first bit rate value comprises:

receiving a revalidation notification for the mobile device, at the gateway, the revalidation notification including a request to revalidate the allowed bit rate associated with the mobile device at a time indicated in the notification; and providing data to the mobile device based on the revalidated allowed bit rate.

17. A system comprising:

a processing device; and a memory storing executable instructions that, when executed by the processing device, cause the processing device to:

receive from a mobile device, a request for data usage, wherein the request is received over a communication network;

in response to receiving the request for data usage, send to a controller, an inquiry for an allowed bit rate and a default priority level associated with the mobile device;

in response to sending the inquiry for the allowed bit rate and the default priority level, receive a first bit rate value as the allowed bit rate and the default priority level associated with the mobile device;

upon receiving the first bit rate value as the allowed bit rate and the default priority level, send to a charging system, a request for a quota associated with the mobile device, wherein the quota indicates an amount of data the mobile device is allowed to use;

in response to the request for the quota associated with the mobile device, receive the quota from the charging system, the quota received from charging system including a slice of a remaining available quota associated with the mobile device prior to a data usage threshold being reached;

in response to receiving the quota from the charging system, enable the mobile device to access data on the communication network based on the first bit rate value and the default priority level until the quota is reached;

receive from the controller, a conditional parameter and a second bit rate value as the allowed bit rate associated with the mobile device, once the data usage threshold for the mobile device is reached subsequent to the quota being reached;

when the conditional parameter indicates that the mobile device is to receive the data, enable the mobile device to access data on the communication network based on the second bit rate value until a predefined activation time is reached; and when the predefined activation time is reached, reset the second bit rate value for the mobile device to the first bit rate value.

18. The method of claim 17, wherein to identify that the data usage threshold is reached the memory further includes instructions that, when executed by the processing device, cause the processing device to:

repeatedly send the request for the quota to the charging system, receive the quota from the charging system, and provide data to the mobile device, until the charging system indicates that the data usage threshold is reached.

19. The system of claim 17, wherein the predefined activation time includes start of a new billing cycle.

20. The system of claim 17, wherein the memory further includes instructions that, when executed by the processing device, cause the processing device to receive a validity time from the charging system along with the first bit rate value, wherein to enable the mobile device to access data on the communication network based on the first bit rate value, the memory further includes instructions that, when executed by the processing device, cause the processing device to enable the mobile device access to data until the validity time is expired.

* * * * *